(12) United States Patent
Wehrmann et al.

(10) Patent No.: US 10,189,941 B2
(45) Date of Patent: Jan. 29, 2019

(54) POLYCARBONATE COMPOSITIONS CONTAINING POLYETHYLENE WAX

(71) Applicant: Covestro Deutschland AG, Leverkusen (DE)

(72) Inventors: Rolf Wehrmann, Krefeld (DE); Helmut Werner Heuer, Leverkusen (DE); Anke Boumans, Goch (DE); Michael Erkelenz, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/532,571

(22) PCT Filed: Dec. 2, 2015

(86) PCT No.: PCT/EP2015/078268
§ 371 (c)(1),
(2) Date: Jun. 2, 2017

(87) PCT Pub. No.: WO2016/087477
PCT Pub. Date: Jun. 9, 2016

(65) Prior Publication Data
US 2017/0355816 A1    Dec. 14, 2017

(30) Foreign Application Priority Data
Dec. 4, 2014  (EP) .................................... 14196206

(51) Int. Cl.
*C08K 3/014* (2018.01)
*C08G 64/00* (2006.01)
*C08L 23/30* (2006.01)
*C08L 69/00* (2006.01)
*C08K 3/013* (2018.01)

(52) U.S. Cl.
CPC .............. *C08G 64/00* (2013.01); *C08K 3/013* (2018.01); *C08K 3/014* (2018.01); *C08L 23/30* (2013.01); *C08L 69/00* (2013.01)

(58) Field of Classification Search
USPC ................................................ 528/196, 198
See application file for complete search history.

(56) References Cited

U.S. PATENT DOCUMENTS

| 2,991,273 A | 7/1961 | Hechelhammer et al. |
| 2,999,835 A | 9/1961 | Goldberg |
| 2,999,846 A | 9/1961 | Schnell et al. |
| 3,148,172 A | 9/1964 | Fox |
| 3,271,367 A | 9/1966 | Schnell et al. |
| 3,879,348 A | 4/1975 | Serini et al. |
| 4,982,014 A | 1/1991 | Freitag et al. |
| 5,132,154 A | 7/1992 | Westeppe et al. |
| 5,235,026 A | 8/1993 | Wulff et al. |
| 5,779,986 A | 7/1998 | van Endert et al. |
| 6,265,525 B1 | 7/2001 | Kinoshita et al. |
| 6,630,563 B2 | 10/2003 | Hucks et al. |
| 7,799,889 B2 | 9/2010 | Meyer et al. |
| 9,676,716 B2 | 6/2017 | Heuer et al. |
| 2004/0089053 A1 | 5/2004 | Kaminski et al. |
| 2005/0288407 A1 | 12/2005 | Heuer et al. |
| 2008/0125530 A1 | 5/2008 | Spitzer et al. |
| 2013/0123423 A1 | 5/2013 | Köhler et al. |

FOREIGN PATENT DOCUMENTS

| DE | 1031512 B | 6/1958 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 3918406 A1 | 12/1990 |
| DE | 4447422 C2 | 7/1996 |
| DE | 102004020673 A1 | 12/2005 |
| DE | 102010014726 A1 | 10/2011 |
| EP | 0262566 A1 | 4/1988 |
| EP | 0433723 A1 | 6/1991 |
| EP | 0517044 A2 | 12/1992 |
| EP | 0953605 A2 | 11/1999 |
| EP | 1253163 A1 | 10/2002 |
| EP | 1609818 A2 | 12/2005 |
| EP | 1925638 A2 | 5/2008 |
| EP | 1377812 B1 | 5/2011 |
| EP | 2338880 A2 | 6/2011 |
| FR | 1561518 A | 3/1969 |
| GB | 1122003 A | 7/1968 |
| GB | 1229482 A | 4/1971 |
| GB | 1367790 A | 9/1974 |
| WO | WO-9928370 A1 | 6/1999 |
| WO | WO-9955772 A1 | 11/1999 |
| WO | WO-2006072344 A1 | 7/2006 |

OTHER PUBLICATIONS

International Search Report for PCT/EP2015/078268 dated Feb. 2, 2016.
International Search Report for PCT/EP2015/078271 dated Jan. 29, 2016.
Written Opinion of the International Searching Authority for PCT/EP2015/078268 dated Feb. 2, 2016.
Written Opinion of the International Searching Authority for PCT/EP2015/078271 dated Jan. 29, 2016.

*Primary Examiner* — Terressa Boykin
(74) *Attorney, Agent, or Firm* — Drinker Biddle & Reath LLP

(57) ABSTRACT

The invention relates to polycarbonate compositions with an improved thermal behavior and improved slip characteristics, achieved by the use of oxidized, acid-modified polyethylene waxes.

13 Claims, No Drawings

POLYCARBONATE COMPOSITIONS CONTAINING POLYETHYLENE WAX

CROSS-REFERENCE TO RELATED APPLICATIONS

This application is a national stage application (under 35 U.S.C. § 371) of PCT/EP2015/078268, filed Dec. 2, 2015, which claims benefit of European Application No. 14196206.8, filed Dec. 4, 2014, both of which are incorporated herein by reference in their entirety.

The invention relates to polycarbonate compositions having improved thermal properties (Vicat temperatures) and improved processing characteristics, to the production thereof and to the use thereof for producing compositions, for example blends, and to moldings obtainable therefrom.

BACKGROUND OF THE INVENTION

Polycarbonates belong to the group of technical thermoplastics. They find versatile application in the electricals and electronics sector (E/E sector), as a housing material for lamps and for applications where particular mechanical properties are required. A further large field of application are optical data storage means such as the various CD and DVD formats as well as Blu-ray disk and HD DVD and also extrusion applications such as polycarbonate sheets, diffuser sheets for backlighting, LED applications and other display applications or water bottles but also optical applications in the automotive sector, such as glazing, plastic covers, diffuser screens or light conducting elements, collimators, lenses, polymeric optical waveguides and also lamp covers for linear luminaires.

Relevant among the thermal properties of polycarbonate compositions are in particular HDT (heat distortion temperature), ball indentation temperature (BIT) and VST (Vicat softening temperature).

Housing materials for E/E applications, for example smart meters, are recently being expected to meet enhanced requirements, in particular improved heat distortion resistance HDT-A or HDT-B. At the same time, other requirements are demanded such as UV stability, good demolding behavior or flame retardant properties which must in each case be established by the use of special additives. However, these additives result in a deterioration of the thermal properties because they act as internal plasticizers which reduce the glass transition temperatures.

In addition to the thermal properties, the polycarbonate compositions also need to have good processing behavior in injection molding. This relates in particular to the demolding behavior of complex three-dimensional components.

EP 1 925 638 A2 describes the use of a synthetic wax oxidate having a number average molecular weight of 300 to 1000 g/mol and an acid number in the range from 15 to 60 mg KOH/g as processing aid in polar transparent polymers. However, it is the effect of the addition of this processing aid on the transparency of the polymer that is investigated here. Thermal properties such as Vicat temperatures or BIT are not addressed. The effect of the processing aids in opaque compositions is not mentioned either. EP 0 262 566 A1 discloses the use of oxidized polyethylene having a number average molecular weight of 7000 to 15 000 g/mol as a demolding agent in ester-free, thermoplastic, aromatic polycarbonates. EP 0433 723 A1 describes the addition of oxidized polyethylenes having a number average molecular weight of 3000 to 5000 g/mol to aromatic polycarbonate resins comprising styrene-acrylonitrile copolymers or acrylonitrile- and styrene-grafted polybutadienes. However, the molar mass of the polyethylenes of the prior art does not give any indication of their acid number or crystallinity.

BRIEF SUMMARY OF THE INVENTION

The present invention accordingly has for its object the development of aromatic polycarbonate compositions having improved thermal properties and improved demolding behavior represented by reduced dynamic and static friction while retaining the other core properties. The present invention in particular has for its object the provision of filled polycarbonate compositions having good heat distortion resistance in the form of a high hall indentation test temperature or Vicat softening temperature and conforming to the requirements of the electricals industry while simultaneously exhibiting good demolding behavior.

It has now been found that, surprisingly, the addition of oxidized acid-modified polyethylene waxes results in improved thermal properties in polycarbonate compositions, simultaneously reduces static and dynamic friction and thus improves demolding behavior in the injection molding process. BITs conforming to the requirements of the electricals industry are obtained. The polycarbonate compositions according to the invention additionally feature reduced dust attraction. It has also been found that the compositions according to the invention exhibit not only improved thermal properties but at the same time also improved melt stability (expressed by delta MVR/IMVR20').

The present invention accordingly provides polycarbonate compositions comprising
A) polycarbonate,
B) oxidized acid-modified polyethylene waxes, wherein mixtures of different oxidized acid-modified polyethylene waxes may also be employed,
C) optionally one or more further additives and
D) an inorganic filler,
wherein the oxidized acid-modified polyethylene waxes each have an acid number of <10 mg KOH/g, a crystallinity of greater than 60% and less than 90%, a melting temperature between 90° C. and 130° C. and a viscosity average molar mass between 1500 g/mol and 5000 g/mol.

DETAILED DESCRIPTION OF THE INVENTION

Component A

According to the invention, "thermoplastic, aromatic polycarbonates" or else just "polycarbonates" is to be understood as encompassing both homopolycarbonates and copolycarbonates, including polyester carbonates, where the polycarbonates may be linear or branched in familiar fashion.

The polycarbonates present in the compositions according to the invention are in principle produced in familiar fashion from diphenols, carbonic acid derivatives and optionally branching agents.

The process for polycarbonate synthesis is generally known and described in numerous publications. EP-A 0 517 044, WO 2006/072344 A1 and EP-A 1 609 818 and documents cited therein describe, for example, the interfacial process and the melt process for producing polycarbonate.

Dihydroxyaryl compounds suitable for producing polycarbonates are those of formula (1)

$$HO-Z-OH \qquad (1),$$

in which

Z is an aromatic radical which has 6 to 30 carbon atoms and comprises one or more aromatic rings, may be substituted and may comprise aliphatic or cycloaliphatic radicals or alkylaryls or heteroatoms as bridging elements.

It is preferable when Z in formula (1) stands for a radical of formula (2)

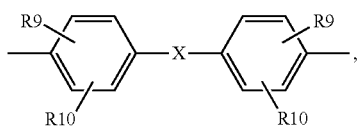

(2)

in which

R$^9$ and R$^{10}$ independently of one another represent H, C$_1$- to C$_{18}$-alkyl-, C$_1$- to C$_{18}$-alkoxy, halogen such as Cl or Br or respectively optionally substituted aryl or aralkyl, preferably H or C$_1$- to C$_{12}$-alkyl, particularly preferably H or C$_1$ to C$_8$-alkyl and very particularly preferably H or methyl, and X represents a single bond, —SO$_2$—, —CO—, —S—, C$_1$- to C$_6$-alkylene, C$_2$- to C$_5$-alkylene or represents C$_6$- to C$_{12}$-arylene which may optionally be fused with further heteroatom-containing aromatic rings.

X preferably represents a single bond, C$_1$- to C$_5$-alkylene, C$_2$- to C$_5$-alkylidene, C$_5$- to C$_{12}$-cycloalkylidene, —O—, —SO—, —CO—, —S—, —SO$_2$—. X particularly preferably represents a single bond, isopropylidene, C$_5$- to C$_{12}$-cycloalkylidene or oxygen.

Diphenols suitable for producing the polycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane.

Particularly preferred diphenols are 2,2-bis(4-hydroxyphenyl)propane (BPA), 4,4'-dihydroxydiphenyl (DOD) and 2,2-bis(3-methyl-4-hydroxyphenyl)propane, 1,1-bis(4-hydroxyphenyl)-3,3,5-trimethylcyclohexane (TMC).

These and further suitable diphenols are described for example in U.S. Pat. No. 2,999,835 A, U.S. Pat. No. 3,148,172 A, U.S. Pat. No. 2,991,273 A, U.S. Pat. No. 3,271,367 A, U.S. Pat. No. 4,982,014 A and U.S. Pat. No. 2,999,846 A, in German laid-open specifications 1 570 703, 2 063 050, 2 036 052, 2 211 956 and 3 832 396, in the French patent specification 1 561 518, in the monograph H. Schnell, "Chemistry and Physics of Polycarbonates", Interscience Publishers, New York 1964, p. 28ff; p. 102ff, and in D. G. Legrand, J. T. Bendler, "Handbook of Polycarbonate Science and Technology", Marcel Dekker New York 2000, p. 72ff.

Only one diphenol is used in the case of the homopolycarbonates; two or more diphenols are used in the case of copolycarbonates. The diphenols employed, similarly to all other chemicals and excipients added to the synthesis, may be contaminated with contaminants from their own synthesis, handling and storage. However, it is desirable to work with the purest possible raw materials.

The thermoplastic polycarbonates used according to the invention typically have molar masses $M_w$ (weight average $M_w$, determined by gel permeation chromatography (GPC), polycarbonate calibration) of 10 000 to 200 000 g/mol, preferably of 15 000 to 100 000 g/mol and particularly preferably of 17 000-70 000 g/mol.

The compositions according to the invention preferably comprise 20.0 to 99.8 wt %, more preferably 89.1 to 99.8 wt %, yet more preferably 90.0 to 99.0 wt %, very particularly preferably 94.0 to 98.0 wt % of polycarbonate.

In a preferred embodiment, the polycarbonate employed according to the invention is not a copolycarbonate comprising monomer units selected from the group consisting of the structural units of general formulae (1a), (1b), (1c) and (1d)

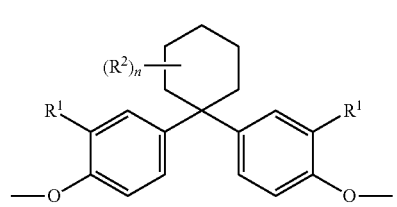

(1a)

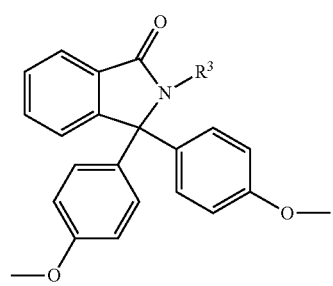

(1b)

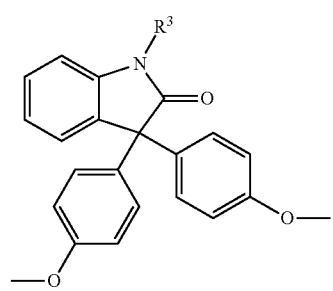

(1c)

-continued (1d)

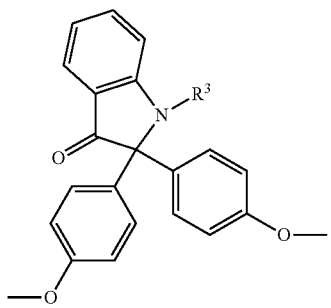

in which
R¹ represents hydrogen or $C_1$-$C_4$-alkyl,
R² represents $C_1$-$C_4$-alkyl,
n represents 0, 1, 2 or 3 and
R³ represents $C_1$-$C_4$-alkyl, aralkyl or aryl,
or blends thereof.
Component B The employed special oxidized acid-modified polyethylene waxes have an oxidation index (OI) of greater than 8, the oxidation index OI being determined by IR spectroscopy. The determination is effected by establishing the ratio of the area of the peak between 1750 $cm^{-1}$ and 1680 $cm^{-1}$ (carbonyl, C=O area) to the area of the peak between 1400 $cm^{-1}$ and 1330 $cm^{-1}$ (aliphatics $CH_x$, aliphatics area). The calculation is as follows:

OI=C=O area/aliphatics area*100.

The determination may be effected with a commercially available FT IR spectrometer, for example a Nicolet 5700 or Thermo Fisher Scientific 20DX FT IR instrument. The employed special oxidized acid-modified polyethylene waxes preferably have an oxidation index (OI) of greater than 8 and smaller than 450, particularly preferably greater than 8 and smaller than 350, very particularly preferably greater than 8 and smaller than 100, likewise preferably greater than 8 and smaller than 50.

The employed special oxidized acid-modified polyethylene waxes, "PE waxes" for short, are PE waxes typically produced by direct polymerization of ethylene by the Ziegler process. In a subsequent reaction step, an air oxidation is effected which results in modified types. These special oxidized types have a content of acid modifications. The polyethylene waxes are available in particular from Mitsui under the brand "Hi-WAX", acid-modified types. The acid numbers are <10 mg KOH/g (HS K0070 test method). These acid numbers are preferably >0 to <10 mg KOH/g, particularly preferably between 0.5 and 9.0 mg KOH/g, very particularly preferably between 0.5 and 8.0 mg KOH/g, likewise preferably between 0.75 and 7.00 mg KOH/g and especially preferably between 0.75 and 5.00 mg KOH/g. The molecular weights ($M_n$) of these oxidized acid-modified polyethylene waxes are preferably between 1500 g/mol to 5000 g/mol, particularly preferably between 2000 g/mol to 4750 g/mol and very particularly preferably between 3000 to 4500 g/mol. The molar mass is preferably determined by the method of viscometry. They also have a crystallinity of greater than 60% and less than 90%. The crystallinity is particularly preferably greater than 65% and less than 85%, very particularly preferably greater than 70% and less than 85%. Their melting points are in the range greater than 90° C. and less than 130° C. The melt viscosities measured at 140° C., determined as per ISO 11443, are between 70 mPas·s and 800 mPa·s.

The oxidized acid-modified polyethylene waxes are preferably supplied to the polycarbonate melt in situ in a continuous or batchwise polycarbonate production process via a side assembly directly or in the form of a masterbatch or in a compounding process directly or in the form of a masterbatch via a side assembly, preferably in the absence of air.

The oxidized acid-modified polyethylene waxes are employed in amounts of 0.05 to 10.0 wt %, preferably 0.08 to 6.0 wt %, more preferably 0.10 to 5.0 wt %, yet more preferably 0.15 to 4.5 wt %, particularly preferably of 0.15 to 4.0 wt %, very particularly preferably 0.2 to 0.5 wt %, based on the overall composition.

Component C

The addition of additives serves for example to extend the useful life in the case of stabilizers which prevent degradation of the composition constituents, the colouring of the end product, to simplify processing—for example in the case of demolding agents, flow assistants, antistats—or to adapt the polymer properties to particular stresses, for example through impact modifiers such as rubbers, flame retardants and/or colorants.

These additives may be added to the polymer melt singly, in any desired mixtures or a plurality of different mixtures, namely directly during isolation of the polymer via a secondary extruder, before pelletization or else after melting of pelletized material in a so-called compounding step. These additives or mixtures thereof may be added to the polymer melt as solid, in particular as a powder, or as a melt. Another manner of metered addition is the use of masterbatches or mixtures of masterbatches of the additives or additive mixtures.

Suitable customary additives for polycarbonate compositions are described for example in "Additives for Plastics Handbook", John Murphy, Elsevier, Oxford 1999, or in "Plastics Additives Handbook", Hans Zweifel, Hanser, Munich 2001 or in WO 99/55772 A1, p. 15-25.

It is preferable when at least one additive from the group of heat stabilizers, demolding agents and/or UV stabilizers is present.

The amounts of the additives selected from the group of heat stabilizers, demolding agents and/or UV stabilizers are, if present, preferably 0.04 to 4.0 wt %, more preferably 0.045 to 3.8 wt % and particularly preferably 0.05 to 3.6 wt %.

It is especially preferable when at least one heat stabilizer is present as an additive.

Preferentially suitable heat stabilizers include tris(2,4-di-tert-butylphenyl) phosphite (IRGAFOS® 168), tetrakis(2,4-di-tert-butylphenyl)-[1,1biphenyl]-4,4'-diylbisphosphonite, triisooctyl phosphate, octadecyl-3-(3,5-di-tert-butyl-4-hydroxyphenyl) propionate (IRGANOX® 1076 from BASF), bis(2,4-dicumylphenyl)pentaerythritol diphosphite (DOVERPHOS® S-9228), bis(2,6-di-tert-butyl-4-methylphenyl)pentaerythritol diphosphite (ADK STAB PEP-36) or triphenylphosphine. Said heat stabilizers are employed alone or as a mixture (for example IRGANOX® B900 (mixture of IRGAFOS® 168 and IRGANOX® 1076 in a 4:1 ratio from BASF) or bis(2,4-dicumylphenyl)pentaerythritol diphosphite (DOVERPHOS® S-9228-PC) with IRGANOX® B900 or IRGANOX® 1076). These stabilizers are typically employed in concentrations of 0.002 wt % to 0.2 wt %, preferably of 0.005 wt % to 0.15 wt %, particularly preferably of 0.006 wt % to 0.12 wt %, in each case based on the overall composition.

Preferably employed primary antioxidants are sterically hindered phenols, for example the IRGANOX® lines from BASF such as IRGANOX® 1076 (octadecyl-3-(3,5-di-tert-butyl-4-hydroxyphenyl) propionate), IRGANOX® 1010 (pentaerythritoltetrakis(3-(3,5-di-tert-butyl-4-hydroxyphenyl) propionate) or IRGANOX® 1035 (thiodiethylenebis[3-(3,5-di-tert-butyl-4-hydroxyphenyl) propionate]).

Compositions preferred in accordance with the invention comprise in addition to at least one heat stabilizer at least one UV stabilizer or a demolding agent.

Even though the compositions according to the invention may comprise demolding agents, embodiments without demolding agents as an additive are preferred. The demolding agents optionally added to the compositions according to the invention are preferably selected from the group comprising pentaerythritol tetrastearate, glycerol monostearate, stearyl stearate and propanediol stearate and also mixtures thereof. The demolding agents are preferably used in amounts of 0.05 wt % to 2.00 wt %, more preferably in amounts of 0.1 wt % to 1.0 wt %, particularly preferably in amounts of 0.15 wt % to 0.60 wt % and very particularly preferably in amounts of 0.2 wt % to 0.5 wt %, in each case based on the overall composition.

UV stabilizers employed are preferably organic UV stabilizers. The UV stabilizers are preferably selected from the group comprising benzotriazoles (for example Tinuvins from BASF), triazines (CGX-06 from BASF), benzophenones (Uvinuls from BASF), cyanoacrylates (Uvinuls from BASF), cinnamic esters and oxalanilides and also mixtures of these UV stabilizers.

Examples of suitable UV absorbers are:

a) malonic esters of formula (I):

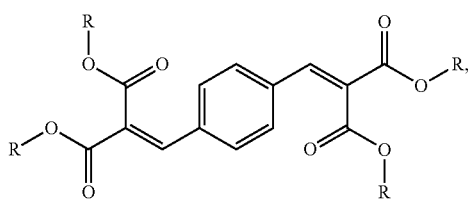

wherein R represents alkyl. R preferably represents $C_1$- to $C_6$-alkyl, especially $C_1$- to $C_4$-alkyl and particularly preferably ethyl.

b) benzotriazole derivatives according to formula (II):

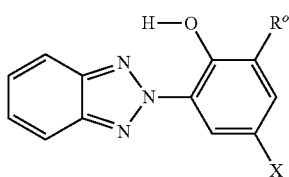

In formula (II), R° and X are independently of one another selected from H, alkyl or alkylaryl.

Preferred benzotriazole derivatives are Tinuvin® 329 where X=1,1,3,3-tetramethylbutyl and R°=H and Tinuvin® 234 where X and R°=1,1-dimethyl-1-phenyl.

c) dimeric benzotriazole derivatives according to formula (III):

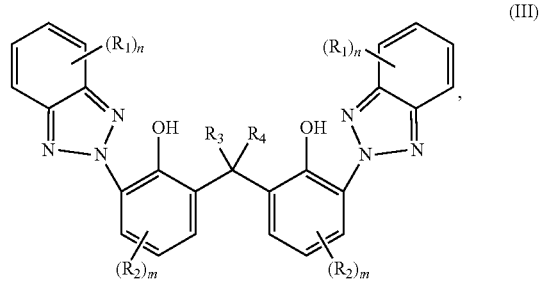

wherein $R_1$ and $R_2$ are independently of one another selected from H, halogen, $C_1$- to $C_{10}$-alkyl, $C_5$- to $C_{10}$-cycloalkyl, $C_7$- to $C_{13}$-aralkyl, $C_6$- to $C_{14}$-aryl, —$OR^5$ or —(CO)—O—$R^5$ where $R^5$=H or $C_1$- to $C_4$-alkyl
and
$R_3$ and $R_4$ are independently of one another selected from H, $C_1$- to $C_4$-alkyl, $C_5$- to $C_6$-cycloalkyl, benzyl or $C_6$- to $C_{14}$-aryl, wherein alkyl groups in $R_1$, $R_2$, $R_3$ and $R_4$ may each be linear or branched,
and wherein
m represents 1, 2 or 3 and n represents 1, 2, 3 or 4.

One preferred benzotriazole derivative is Tinuvin® 360 (BASF) where $R_1$=$R_3$=$R_4$=H; n=4; $R_2$=4-1,1,3,3-tetramethylbutyl; m=1 or Tinuvin 1600 (BASF).

d) dimeric benzotriazole derivatives according to formula (IV):

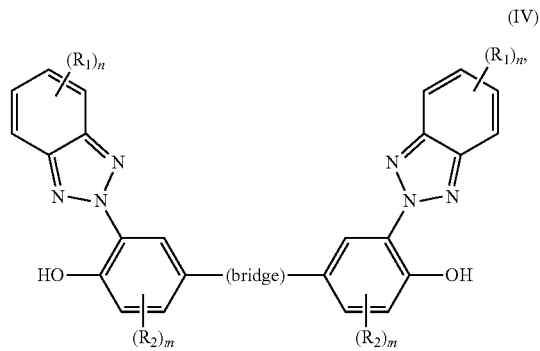

in which the bridge represents

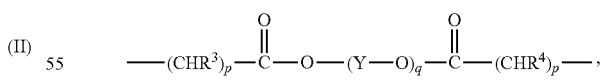

$R_1$ and $R_2$ are independently of one another selected from H, halogen, $C_1$- to $C_{10}$-alkyl, $C_5$- to $C_{10}$-cycloalkyl, $C_7$- to $C_{13}$-aralkyl, $C_6$- to $C_{14}$-aryl, —$OR_5$ or —(CO)—O—$R_5$ where $R_5$=H or $C_1$- to $C_4$-alkyl
and
m represents 1, 2 or 3 and n represents 1, 2, 3 or 4
and in which p is an integer from 0 to 3, q is an integer from 1 to 10, Y equals —$CH_2$—, —$(CH_2)_2$—, —$(CH_2)_3$—, —$(CH_2)_4$—, —$(CH_2)_5$—, —$(CH_2)_6$—, or —$CH(CH_3)$—$CH_2$— and
$R_3$ and $R_4$ are independently of one another selected from H, $C_1$- to $C_4$-alkyl, $C_5$- to $C_6$-cycloalkyl, benzyl or $C_6$- to $C_{14}$-aryl, wherein alkyl groups in $R_1$, $R_2$, $R_3$ and $R_4$ may each be linear or branched.

Preference is given to Tinuvin® 840 where $R_1$=H; n=4; $R_2$=tert-butyl; m=1; $R_2$ is attached ortho to the OH group; $R_3$=$R_4$=H; p=2; Y=—(CH$_2$)$_5$—; q=1.

e) triazine derivatives according to formula (V);

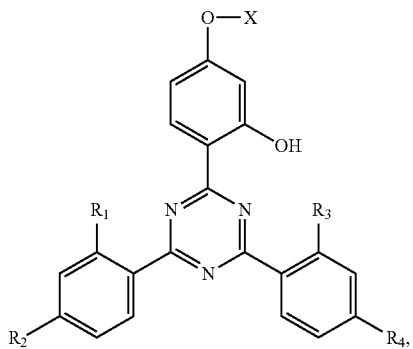

(V)

in which $R_1$, $R_2$, $R_3$, $R_4$ are independently of one another selected from H, alkyl, aryl, CN or halogen
and
X equals linear or branched alkyl, preferably isooctyl.

One preferred triazine derivative is Tinuvin® 1577 where $R_1$=$R_2$=$R_3$=$R_4$=H; X=hexyl and Cyasorb UV-1 164 where $R_1$=$R_2$=$R_3$=$R_4$=methyl; X=octyl.

f) triazine derivatives of the following formula (Va):

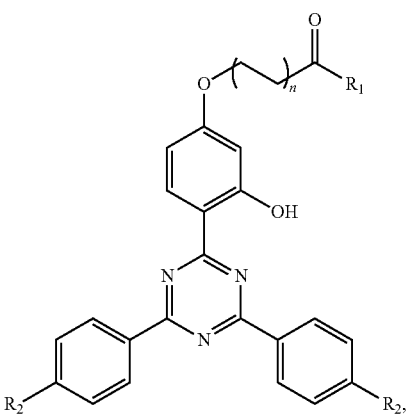

(Va)

in which $R_1$ equals $C_1$-alkyl to $C_{17}$-alkyl, in each case linear or branched,
$R_2$ equals H or $C_1$-alkyl to $C_4$-alkyl, in each case linear or branched
and
n equals 0 to 20.

g) dimeric triazine derivatives of formula (VI):

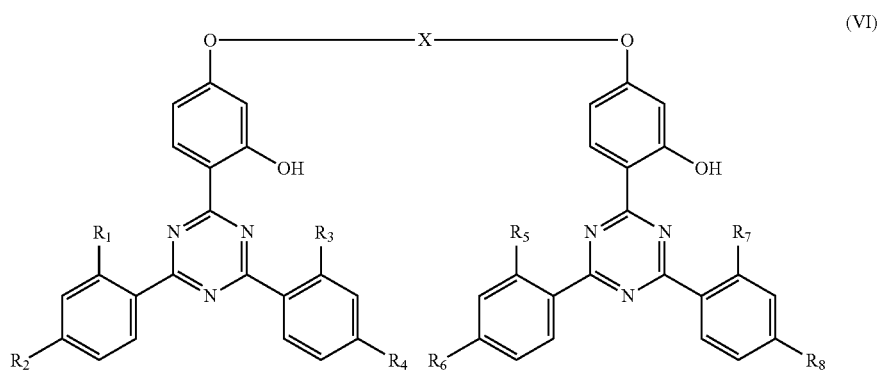

(VI)

in which $R_1$, $R_2$, $R_3$, $R_4$, $R_5$, $R_6$, $R_7$, $R_8$ are independently of one another selected from H, alkyl—linear or branched—, CN or halogen
and
X equals alkylidene, preferably methylidene, or —(CH$_2$—CH$_2$—O—)$_n$—C(=O)—
and
n equals 1 to 10, preferably 1 to 5, in particular 1 to 3.

h) diarylcyanoacrylates of formula (VII):

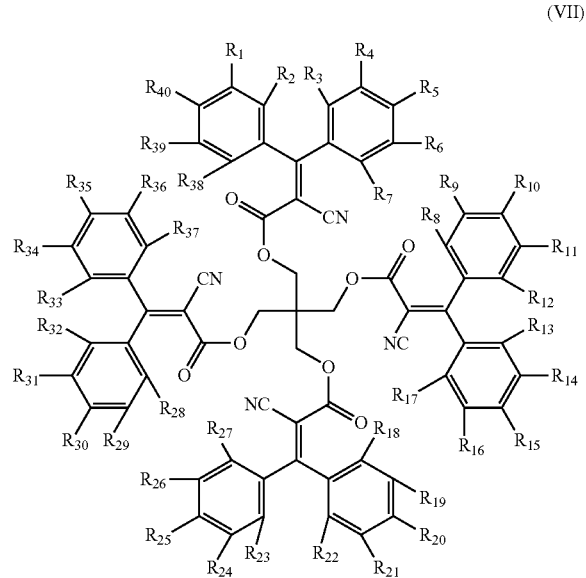

(VII)

in which $R_1$ to $R_{40}$ are independently of one another selected from H, alkyl—linear or branched—, CN or halogen.

One preferred diarylcyanoacrylate is Uvinul® 3030 where $R_1$ to $R_{40}$=H.

Particularly preferred UV stabilizers for the compositions according to the invention are compounds from the group consisting of the benzotriazoles (b), dimeric benzotriazoles (c and d), the malonic esters (a) and the cyanoacrylates (h), individually and mixtures of these compounds.

The UV stabilizers are employed in amounts of 0.01 wt % to 1.00 wt %, preferably in amounts of 0.05 wt % to 0.80 wt %, more preferably in amounts of 0.08 wt % to 0.5 wt %, yet more preferably in amounts of 0.1 wt % to 0.4 wt %, particularly preferably in amounts of 0.12 wt % to 0.35 wt % and very particularly preferably in amounts of 0.12 wt % to 0.3 wt %, in each case based on the overall composition.

Provided the composition is used as a masterbatch for UV absorbers or as a coextrusion layer, the content of UV absorbers may be 3-20 wt %, preferably 5-8 wt %, based on the overall composition.

Also preferred are compositions comprising abovementioned oxidized acid-modified polyethylene waxes and at least one additive selected from the group consisting of heat stabilizers, demolding agents and UV stabilizers and additional additives such as flame retardants and optionally colorants, antistats andior further customary additives such as impact modifiers.

Suitable flame retardants in the context of the present invention include inter alia alkali metal or alkaline earth metal salts of aliphatic or aromatic sulfonic acid, sulfonamide and sulfonimide derivatives.

Salts which may be used in the compositions according to the invention are for example: Sodium perfluorobutanesulfate, potassium perfluorobutanesulfate, sodium perfluoromethanesulfonate, potassium perfluoromethanesulfonate, sodium perfluorooctanesulfate, potassium perfluorooctanesulfate, sodium 2,5-dichlorobenzenesulfate, potassium 2,5-dichlorobenzenesulfate, sodium 2,4,5-trichlorobenzenesulfate, potassium 2,4,5-trichlorobenzenesulfate, sodium inethylphosphonate, potassium methylphosphonate, sodium (2-phenylethylene)phosphonate, potassium (2-phenylethylene)phosphonate, sodium pentachlorobenzoate, potassium pentachlorobenzoate, sodium 2,4,6-trichlorobenzoate, potassium 2,4,6-trichlorobenzoate, sodium 2,4-dichlorobenzoate, potassium 2,4-dichlorobenzoate, lithium phenylphosphonate, sodium diphenyl sulfone sulfonate, potassium diphenyl sulfone sulfonate, sodium 2-formylbenzenesulfonate, potassium 2-fortnylbenzenesulfonate, sodium (N-benzenesulfonyl)benzenesulfonamide, potassium (N-benzenesulthnyl)benzenesulfonamide, trisodium hexafluoroaluminate, tripotassium hexafluoroaluminate, disodium hexafluorotitanate, dipotassium hexafluorotitanate, disodium hexafluorosilicate, dipotassium hexafluorosilicate, disodium hexafluorozirconate, dipotassium hexafluorozirconate, sodium pyrophosphate, potassium pyrophosphate, sodium metaphosphate, potassium metaphosphate, sodium tetrafluoroborate, potassium tetrafluoroborate, sodium hexafluorophosphate, potassium hexafluorophosphate, sodium phosphate, potassium phosphate, lithium phosphate, N-(p-tolylsulfonyl)-p-toluenesulfimide potassium salt, N—(N'-benzylaminocarbonyl)sulfanylimide potassium salt, sodium nonafluoro-1-butanesulfonate, potassium nonafluoro-1-butanesulfonate or mixtures thereof.

Preference is given to using sodium perfluorobutanesulfate, potassium perfluorobutanesulfate, sodium perfluorooctanesulfate, potassium perfluorooctanesulfate, sodium diphenyl sulfone sulfonate, potassium diphenyl sulfone sulfonate, sodium 2,4,6-trichlorobenzoate, potassium 2,4,6-trichlorobenzoate N-(p-tolylsulfonyl)-p-toluenesulfimide potassium salt, N—(N'-benzylaminocarbonyl)sulfanylimide potassium salt. Very particular preference is given to potassium nonafluoro-1-butanesulfonate or sodium diphenyl sulfone sulfonate or potassium diphenyl sulfone sulfonate. Potassium nonafluoro-1-butanesulfonate is commercially available, inter alia, as Bayowet®C4 (from Lanxess, Leverkusen, Germany, CAS No. 29420-49-3), RM64 (from Miteni, Italy) or as 3M™ perfluorobutanesulfonyl fluoride FC-51 (from 3M, USA). Mixtures of the recited salts are likewise suitable.

The amount of flame retardants in the compositions according to the invention is preferably 0.001 to 1.0 wt %, more preferably 0.05 to 0.80 wt %, yet more preferably 0.10 to 0.60 wt %, particularly preferably 0.10 to 0.40 wt %.

When polymeric flame retardant additives, for example PTFE or fluorine-containing olefin polymers or olefin copolymers, are used, the amount thereof is 0.1 to 1.0 wt %, preferably 0.1 to 0.9 wt % and particularly preferably 0.15 to 0.85 wt %.

Colorants, such as organic dyes or pigments or inorganic pigments, IR absorbers with stabilizers, organic and/or inorganic diffusing pigments, may be added.

Component D

Inorganic fillers are a further component of the compositions according to the invention.

The inorganic fillers present in the compositions according to the invention are for example glass fibers, (hollow) glass spheres, carbon fibers, silica, quartz, minerals, titanium dioxide, boron nitride and/or talc. The inorganic fillers are preferably at least one glass fiber. It is particularly preferable when this at least one glass fiber has a (nominal) diameter of 10 to 20 μm. It is likewise preferable when the average (nominal) fiber length is 3 to 5.5 mm. The glass used is preferably E-glass (DIN 1259). The amounts of inorganic fillers are preferably 1 to 45.0 wt %, more preferably 2.0 to 40.0 wt %, yet more preferably 3.0 to 35.0 wt %, particularly preferably 5.0 to 30.0 wt %, very particularly preferably 7.5 to 15 wt % (based on the overall composition).

The polycarbonate compositions according to the invention may be processed in customary fashion in standard machines, for example in extruders or injection molding machines, to afford any desired molded articles or films, sheets or other semifinished products such as pipes, profiles, rods or bottles.

The polycarbonate compositions having improved melt properties according to the present invention are preferably used for producing injection molded parts and extrudates (sheets, films and laminates thereof, for example for card applications and pipes). The polycarbonate compositions according to the invention are further preferably employed for producing articles for the electricals/electronics sector and the IT sector, for example housing parts, frames, covers, backwalls, switches, plugs, etc.

A further large field of application for the polycarbonate compositions according to the invention are display applications but also optical applications in the automotive sector, such as plastic covers, frames for sunroofs, UV-protected diffuser and covering screens and lamp covers for linear luminaires or injection molded parts for LED technologies (reflectors, shades, housing parts, heat sinks, etc.).

The polycarbonate compositions of the present invention are in particular used for producing compounds, blends, for example PC/ABS, PC/ASA, PC/SAN, PC/PBT, PC/PET or PC/PETG and components placing particular demands on thermal and mechanical properties, for example for housings, articles in the E/E sector, such as plugs, switches, boards, lamp holders, lamp covers, lamp fittings, lamp covers, glazing in the automotive sector, dialysers, connectors, cocks, packaging such as bottles, containers in the medical sector.

Particularly preferred compositions according to the invention consist of
A) 46.0 to 99.8 wt % of polycarbonate,
B) 0.05 to 10 wt %, very particularly preferably 0.15 to 4.0 wt %, of oxidized acid-modified polyethylene wax,
C1) 0.04 to 4.0 wt %, very particularly preferably 0.05 to 3.6 wt %, of additives selected from the group of heat stabilizers, demolding agents and/or UV stabilizers,
C2) optionally further additives selected from the group of flame retardants, colorants, antistats and/or impact modifiers and
D) 0.00 to 40.0 wt %, very particularly preferably 5.0 to 30.0 wt %, of inorganic fillers.

Very particularly preferred compositions consist of
A) 65.0 to 99.8 wt % of polycarbonate, preferably 65.0 to 99.8 wt % of polycarbonate and very particularly preferably 75.0 to 99.8 wt % of polycarbonate,
B) 0.15 to 4.0 wt %, in particular 0.2 to 0.5 wt %, of oxidized acid-modified polyethylene wax,
C1) 0.05 to 3.6 wt % of additives selected from the group of heat stabilizers and/or UV stabilizers,
C2) 0 to 1 wt % of flame retardants and
D) 0 to 30 wt % of glass fibers.

In a preferred embodiment, the compositions according to the invention have a ball indentation test temperature according to IEC 60335-1 of at least 135° C., preferably of at least 136° C. and particularly preferably of at least 137° C. The present invention accordingly relates in a further aspect to the use of oxidized acid-modified polyethylene waxes for reducing the coefficients of dynamic and static friction and/or improving the ball indentation temperature of polycarbonate compositions filled with at least one inorganic filler. The oxidized acid-modified polyethylene waxes and/or the inorganic fillers are preferably the polyethylene waxes and/or inorganic fillers previously described hereinabove in any and all embodiments or preferences.

EXAMPLES

Raw materials used:
PC-1: Heat-stabilized bisphenol A polycarbonate having a melt volume flow rate MVR of 12.5 cm$^3$/10 min at 300° C./1.2 kg, Covestro Deutschland AG (previously Bayer MaterialScience AG, Leverkusen);
PC-2: Polycarbonate powder based on Makrolon 3108 (Bisphenol A polycarbonate having a melt volume flow rate MVR of 6 cm$^3$/10 min at 300° C./1.2 kg, Covestro Deutschland AG (previously Bayer MaterialScience AG, Leverkusen));
PC-3: Heat-stabilized BPA polycarbonate having a melt volume flow rate MVR of 9.5 cm$^3$/10 min at 300° C./1.2 kg, Covestro Deutschland AG (previously Bayer MaterialScience AG, Leverkusen);
PC-4: Heat-stabilized BPA polycarbonate having a melt volume flow rate MVR of 6 cm$^3$/10 min at 300° C./1.2 kg, Covestro Deutschland AG (previously Bayer MaterialScience AG, Leverkusen);
TOF Triisooctyl phosphate, Lanxess AG, Leverkusen;
PETS: Pentaerythritol tetrastearate: Loxiol VPG 861, Emery Oleochemicals;
Tin 329: Tinuvin 329; hydroxybenzotriazole, UV absorber, BASF SE, Ludwigshafen;
Glass fiber: Chopped Strands CS 7942 glass fiber, fiber diameter 14 μm, fiber length 4.5 mm, Lanxess AG, Leverkusen;
PE wax: Oxidized acid-modified polyethylene wax having a molecular weight of 4000 g/mol, an acid number of 1 mg KOH/g, a degree of crystallinity of 80% and a melting point (DSC) of 121° C. and also a melt viscosity (at 140° C.) of 650 mPa*s. Hi-Wax 405MP from Mitsui Chemicals Inc. was used. The oxidation index (determined according to the method described above) is 9.
C4 salt: Potassium perfluorobutanesulfonate; Lanxess AG, Leverkusen
Comparative waxes: Oxidized acid-modified polyethylene wax (I) having a molecular weight of 2600 g/mol, an acid number of 17 mg KOH/g, a degree of crystallinity of 62% and a melting point (DSC) of 100° C. and also a melt viscosity (at 140° C.) of 300 mPa*s. Hi-Wax 4202E from Mitsui. Chemicals Inc. was used. The oxidation index (determined according to the method described above) is 481.
Acid-modified polyethylene wax (II) having a molecular weight of 1500 g/mol, an acid number of 60 mg KOH/g, a degree of crystallinity of 60% and a melting point (DSC) of 104° C. and also a melt viscosity (at 140° C.) of 150 mPa*s. Hi-Wax 1105A from Mitsui Chemicals Inc, was used. The oxidation index (determined according to the method described above) is 1057.
Melt viscosity was determined as per ISO 11443 with a Göttfert Visco-Robo 45.00 instrument.
Melt volume flow rate MVR was determined in accordance with ISO 1133 at a test temperature of 300° C. and loading of 1.2 kg using a Zwick 4106 instrument from Zwick Roell. The abbreviation MVR stands for the starting melt volume flow rate (after 5 minutes preheating time) and the abbreviation IMVR20' stands for melt volume flow rate after 20 min.

The Vicat softening temperature VST/B50 as a measure of heat distortion resistance was determined in accordance with ISO 306 on test specimens measuring (80×10×4) mm with a 50 N ram loading and a heating rate of 50° C./h with a Coesfeld Eco 2920 instrument from Coesfeld Materialtest.

The heat deflection temperature (HDT) as a measure of distortion temperature was measured according to DIN EN ISO 75 on test specimens having the dimensions (80×10×4) mm with a loading of 1.8 MPa (HDT A) or 0.45 MPa (HDT B) with a HDT Vollautomat instrument from Coesfeld.

Heat resistance (ball indentation test, BIT) was measured according to IEC 60335-1 on test specimens having the dimensions (127×12.7×3) mm.

The coefficients of friction were determined using a modified Arburg-370S-800-150 injection molding machine. The method is described in EP 1 377 812 B1. Comparative examples 1 to 3 and 6 to 7 are used as an internal standard.

The fire behavior was measured according to UL94 Von bars having the dimensions (127×12.7×1.5) mm.

TABLE 1

Performed experiments 1 to 9

| | | 1 (comp.) | 2 (comp.) | 3 (comp.) | 4 (comp.) | 5 (comp.) | 6 (comp) | 7 (comp.) | 8 (comp.) | 9 (comp.) |
|---|---|---|---|---|---|---|---|---|---|---|
| Formulation: | | | | | | | | | | |
| PC-1 | wt % | 85.0 | 85.0 | 85.0 | 85.0 | 85.0 | 85.0 | 85.0 | 85.0 | 85.0 |
| PC-2 | wt % | 15.0 | 14.8 | 14.6 | 14.8 | 14.6 | 14.8 | 14.6 | 14.8 | 14.6 |
| PETS | wt % | — | 0.2 | 0.4 | — | — | — | — | — | — |
| oxid. acid-mod. PE wax | wt % | — | — | — | 0.2 | 0.4 | — | — | — | — |
| comparative wax (I) | wt % | — | — | — | — | — | 0.2 | 0.4 | — | — |
| comparative wax (II) | wt % | — | — | — | — | — | — | — | 0.2 | 0.4 |
| Tests: | | | | | | | | | | |
| MVR | cm$^3$/10 min | 9.7 | 9.8 | 10.1 | 9.6 | 9.9 | 11.3 | 12.1 | 11.4 | 11.3 |
| IMVR20' | cm$^3$/10 min | 9.6 | 9.9 | 10.4 | 9.7 | 9.8 | 11.3 | 12.8 | 11.9 | 11.9 |
| delta MVR/IMVR20' | | −0.1 | 0.1 | 0.3 | 0.1 | −0.1 | 0.0 | 0.7 | 0.5 | 0.6 |
| vicat VST/B/50 | ° C. | 146.8 | 145.6 | 144.0 | 146.3 | 145.5 | 145.9 | 145.4 | 145.5 | 145.2 |
| Coefficients of friction | | | | | | | | | | |
| static friction | | 0.60 | 0.35 | 0.32 | 0.25 | 0.23 | | | | |
| dynamic friction | | 0.51 | 0.33 | 0.30 | 0.23 | 0.21 | | | | |

Examples 1 to 9 are comparative examples. It is apparent that the polycarbonate compositions of examples 4 and 5 comprising the oxidized acid-modified polyethylene wax have higher Vicat temperatures than compositions comprising the same amount of the conventional demolding agent PETS or comprising comparative waxes having higher acid numbers while also exhibiting reduced coefficients of static and dynamic friction. The compositions 4 and 5 accordingly have improved thermal properties while also being easier to process on account of the low friction.

It is furthermore a feature of examples 4 and 5 that test specimens ((155×75×2.3) mm sheets) produced from the polycarbonate compositions attract markedly less dust in a dust atmosphere (coal dust). This is advantageous for injection molded parts in use.

TABLE 2

Performed experiments 10 to 17

| | | 10 (comp.) | 11 (comp.) | 12 | 13 | 14 (comp.) | 15 (comp.) | 16 (comp.) | 17 (comp.) |
|---|---|---|---|---|---|---|---|---|---|
| Raw materials | | | | | | | | | |
| PC-3 | wt % | 79.1 | 79.09 | 79.19 | 79.09 | 79.19 | 79.09 | 79.19 | 79.09 |
| PC-4 | wt % | 10.0 | 10.0 | 10.0 | 10.0 | 10.0 | 10.0 | 10.0 | 10.0 |
| GF CS 7942 | wt % | 10.0 | 10.0 | 10.0 | 10.0 | 10.0 | 10.0 | 10.0 | 10.0 |
| PETS | wt % | 0.45 | 0.45 | — | — | — | — | — | — |
| oxid. acid-mod. PE wax | wt % | — | — | 0.35 | 0.45 | — | — | — | — |
| TIN 329 | wt % | 0.25 | 0.25 | 0.25 | 0.25 | 0.25 | 0.25 | 0.23 | 0.25 |
| C4 salt | wt % | 0.20 | 0.20 | 0.20 | 0.20 | 0.20 | 0.20 | 0.20 | 0.20 |
| TOF | wt % | — | 0.01 | 0.01 | 0.01 | 0.01 | 0.01 | 0.01 | 0.01 |
| comparative wax (I) | wt % | — | — | — | — | 0.35 | 0.45 | — | — |
| comparative wax (II) | wt % | — | — | — | — | — | — | 0.35 | 0.45 |

TABLE 2-continued

Performed experiments 10 to 17

| | | 10 (comp.) | 11 (comp.) | 12 | 13 | 14 (comp.) | 15 (comp.) | 16 (comp.) | 17 (comp.) |
|---|---|---|---|---|---|---|---|---|---|
| Tests: | | | | | | | | | |
| MVR | ml/10 min | 10.0 | 6.4 | 6.3 | 6.0 | 7.2 | 7.5 | 6.5 | 6.5 |
| IMVP20' | ml/10 min | 11.8 | 7.2 | 7.1 | 6.9 | 8.5 | 8.5 | 7.2 | 7.2 |
| delta MVR/IMVR20' | | 1.8 | 0.8 | 0.8 | 0.9 | 1.3 | 1.0 | 0.7 | 0.7 |
| Vicat VST/B/50 | °C. | 144.5 | 144.7 | 147.1 | 147.2 | 45.6 | 144.6 | 143.1 | 142.7 |
| HDT A | °C. | 134.7 | 135.2 | 138.3 | 137.8 | 136.6 | 137.1 | 133.1 | 131.9 |
| HDT B | °C. | 141.7 | 141.6 | 144.8 | 144.9 | 143.3 | 143.5 | 141.4 | 140.6 |
| BIT | °C. | 136 | 115 | 138 | 138 | 136 | 136 | 136 | 135 |
| Mechanics | | | | | | | | | |
| ISO180/1U impact strength | kJ/m² | 58 brittle | 50 brittle | 41 brittle | 42 brittle | — | — | | |
| UL94V (1.5 mm) overall assessment | s | V2 | V0 | V1 | V0 | — | — | | |
| Coefficient of friction | | | | | | | | | |
| static friction | | 0.30 | 0.25 | 0.18 | 0.19 | — | — | | |
| dynamic friction | | 0.28 | 0.23 | 0.17 | 0.18 | — | — | | |

Examples 10 and 11 and 14 and 17 are comparative examples while examples 12 and 13 are according to the invention. It is apparent that the polycarbonate compositions according to the invention of examples 12 and 13 comprising the oxidized acid-modified polyethylene wax have higher Vicat temperatures, higher heat distortion temperatures (HDT) and improved ball indentation temperatures (BIT) while also exhibiting reduced coefficients of static and dynamic friction than corresponding compositions comprising the conventional demolding agent PETS or comprising comparative waxes having a higher acid number. Particularly for smart meter applications, ball indentation temperatures of 134° C. to 136° C., as are achieved with comparable amounts of PETS in the polycarbonate compositions, are too low. The effect achieved by employment of the oxidized acid-modified polyethylene waxes is particularly noticeable in example 12 in which the content of oxidized acid-modified polyethylene wax was even reduced compared to the PETS of comparative example 11.

Compared to comparative examples 14 and 17, it is apparent that the reduction in the acid number of the oxidized acid-modified polyethylene wax results in better thermal properties while also resulting in better melt stability. Vicat temperatures and BIT at least about 2° C. above the values obtained using higher acid numbers in the polyethylene wax were achieved in accordance with the invention. In addition the compositions according to the invention also result in a lower delta MVR/IMVR20' than when the comparative wax (I) is used which demonstrates that a better melt stability is present than when a comparable wax having a higher acid number is used.

The polycarbonate compositions according to the invention thus have improved thermal properties while also being easier to process on account of the low friction.

The invention claimed is:
1. A polycarbonate composition comprising
A) polycarbonate
B) oxidized acid-modified polyethylene wax and
D) an inorganic filler,
wherein the oxidized acid-modified polyethylene wax has an acid number of <10 mg KOH/g determined according to JIS K0070, a crystallinity of greater than 60% and less than 90%, a melting point between 90° C. and 130° C. and a viscosity average molar mass determined by viscometry between 1500 g/mol and 5000 g/mol.
2. The composition as claimed in claim 1, wherein the composition comprises 20.0 to 99.8 wt % of polycarbonate.
3. The composition as claimed in claim 1, wherein the composition comprises 0.05 to 10.0 wt % of oxidized acid-modified polyethylene wax.
4. The composition as claimed in claim 1, wherein the composition comprises 0.2 to 0.5 wt % of oxidized acid-modified polyethylene wax.
5. The composition as claimed in claim 1, wherein the composition comprises 0.04 to 4.0 wt % of additives selected from the group consisting of heat stabilizers, demolding agents and UV stabilizers.
6. The composition as claimed in claim 1, wherein the composition comprises flame retardants and/or colorants.
7. The composition as claimed in claim 1, wherein inorganic filler is a glass fiber.
8. The composition as claimed in claim 1, wherein the composition comprises 0.002 to 0.2 wt % of heat stabilizer, 0.01 wt % to 1.00 wt % of UV stabilizer and 0.05 wt % to 2.00 wt % of demolding agent.
9. The composition as claimed in claim 1, wherein the oxidation index of the oxidized acid-modified polyethylene wax is greater than 8.
10. The composition as claimed in claim 1, wherein the oxidized acid-modified polyethylene wax has a melt viscosity, determined as per ISO 11443, between 70 mPa·s and 800 mPa·s.
11. The composition as claimed in claim 1, wherein it consists of
A) 46.0 to 99.8 wt % of polycarbonate,
B) 0.05 to 10 wt % of oxidized acid-modified polyethylene wax,
C1) 0.04 to 4.0 wt % of additives selected from the group of heat stabilizers, demolding agents and/or UV stabilizers,
C2) optionally further additives selected from the group of flame retardants, colorants, antistats and/or impact modifiers, and
D) 5.0 to 30.0 wt % of inorganic fillers.

12. A molding produced from a composition as claimed in claim 1.

13. A method comprising utilizing an oxidized acid-modified polyethylene wax for reducing the coefficients of dynamic and static friction and/or improving the ball indentation temperature of polycarbonate compositions filled with at least one inorganic filler, wherein the oxidized acid-modified polyethylene wax has an acid number of <10 mg KOH/g determined according to JIS K0070, a crystallinity of greater than 60% and less than 90%, a melting point between 90° C. and 130° C. and a viscosity average molar mass determined by viscometry between 1500 g/mol and 5000 g/mol.

* * * * *